US011906295B1

United States Patent
Wang et al.

(10) Patent No.: US 11,906,295 B1
(45) Date of Patent: Feb. 20, 2024

(54) FLEXIBLE MEASURING RULER

(71) Applicant: Wuyi University, Jiangmen (CN)

(72) Inventors: Fei Wang, Jiangmen (CN); Guxin Wu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 0 days.

(21) Appl. No.: 18/332,570

(22) Filed: Jun. 9, 2023

(30) Foreign Application Priority Data

Nov. 24, 2022  (CN) .......................... 202211486832.X

(51) Int. Cl.
*G01B 3/10* (2020.01)
*G01B 3/1003* (2020.01)
*G01L 1/20* (2006.01)
*G01B 3/1069* (2020.01)

(52) U.S. Cl.
CPC ......... *G01B 3/1003* (2020.01); *G01B 3/1069* (2020.01); *G01L 1/205* (2013.01)

(58) Field of Classification Search
CPC ... G01B 3/1003; G01B 3/1061; G01B 3/1069
USPC .......................................................... 33/763
See application file for complete search history.

(56) References Cited

U.S. PATENT DOCUMENTS

| | | | | |
|---|---|---|---|---|
| 4,611,402 A | * | 9/1986 | Yamamoto | G01B 3/1061 33/762 |
| 5,027,526 A | * | 7/1991 | Crane | A43D 1/027 33/763 |
| 5,142,793 A | * | 9/1992 | Crane | G01B 3/1061 33/763 |
| 5,386,643 A | * | 2/1995 | Corcoran | G01B 3/1061 242/564.2 |
| 5,894,678 A | * | 4/1999 | Masreliez | G01B 7/026 33/762 |
| 6,499,226 B1 | * | 12/2002 | Reda | G01B 3/1003 33/771 |

(Continued)

FOREIGN PATENT DOCUMENTS

| | | |
|---|---|---|
| CN | 207113791 U | 3/2018 |
| CN | 215114382 U | 12/2021 |

OTHER PUBLICATIONS

CNIPA, Notification of a Second Office Action for CN202211486832.X, dated Jul. 29, 2023.

(Continued)

*Primary Examiner* — George B Bennett
(74) *Attorney, Agent, or Firm* — Zhigang Ma

(57) ABSTRACT

A flexible measuring ruler includes a flexible ruler body and a measuring device, a conductive layer is disposed on the flexible ruler body, which regularly arranged along a length of the flexible ruler body, a linear resistance of the conductive layer changes regularly along the length of the flexible ruler body; the measuring device includes a data collector and a date processor, the data collector includes a resistance measuring circuit including positive and negative probes, when measuring with the flexible ruler body, the data processor converts a resistance value measured by the data collector into a length value based on a variation rule of the linear resistance of the conductive layer along the length direction of the flexible ruler body. The flexible measuring ruler has a simple structure principle, easy operation and high measurement accuracy.

6 Claims, 4 Drawing Sheets

(56) References Cited

U.S. PATENT DOCUMENTS

| | | | |
|---|---|---|---|
| 2014/0250708 A1* | 9/2014 | Bauer | G01B 3/1061 33/760 |
| 2023/0028583 A1* | 1/2023 | Liu | G01B 3/1003 |
| 2023/0081254 A1* | 3/2023 | Liang | G11B 5/584 33/700 |

OTHER PUBLICATIONS

Wuyi University (Applicant), Reply to Notification of a Second Office Action for CN202211486832.X, w/ (allowed) replacement claims, dated Aug. 4, 2023.

CNIPA, Notification to grant patent right for invention in CN202211486832.X, dated Aug. 17, 2023.

* cited by examiner

FLEXIBLE MEASURING RULER

TECHNICAL FIELD

The disclosure relates to the technical field of measuring instruments, and particularly to a flexible measuring ruler.

BACKGROUND

When traditional dimension measuring tools such as tape measures or rulers measure three-dimensional dimensions of objects and human bodies, they need human eyes to observe and identify the dimensions and need to record dimension data manually, and the manual measurement error is very large. With the development of digital technologies, intelligent tape measures have emerged to solve the above problems, which can achieve intelligent measurement and automatic recording and storage of data, but the intelligent tape measures have complex principles, expensive prices, poor measurement accuracy, and inconvenient use, which cannot enable real intelligence. Current smart phones, such as the iPhones, can easily achieve non-contact distance measurement through visual inertial measurement systems. However, it is limited to linear distance mapping and the accuracy is poor.

Chinese patent application No. 201680001390.1 (Chinese patent publication No. CN106461365A) discloses a length measuring device and a length measuring system, the length measuring device includes a rotation section and a detecting section, which converts to length by detecting the amount of rotation and realizes the measurement digitization. However, this patent application has a complex mechanical structure, requires high machining accuracy, and requires precision rotational angle measurement equipment, so the overall cost is high. Chinese patent application No. 201510115485.3 (Chinese patent publication No. CN104677221A) discloses an intelligent tape measure based on CMOS image sensor and its measurement method, this intelligent tape measure includes a CMOS image sensor, a lighting module, a display screen, buttons, and a wireless transmission module. The intelligent tape measure collects a ruler surface image through the CMOS image sensor for image processing, and outputs measurement results to the display screen for displaying, which achieves automated ruler reading and data transmission. However, the OV7620 module used in this image sensor is expensive and not conducive to cost control. Chinese patent application No. 202022249803.4 (Chinese patent publication No. CN213606356U) discloses an intelligent tape measure for measuring dimensions and lengths of human organs, the intelligent tape measure includes a display device. A ruler of this patent drives a counting drum (i.e., drum counter) to rotate and count by pulling out the ruler, and the display device displays a length of the tape measure. But the drum counter belongs to mechanical counting and has low measurement accuracy.

In summary, a flexible measuring ruler with simple structural principles and high measurement accuracy is needed.

SUMMARY

A technical problem to be solved by the present disclosure is to provide a flexible measuring ruler that converts a resistance value of a part of the conductive layer corresponding to a measuring part of the ruler body into a length value, with a simple structural principle and a high measurement accuracy.

To achieve the above objectives, the disclosure provides a flexible measuring ruler including a flexible ruler body and a measuring device, the flexible ruler body is provided with a conductive layer, and the conducting layer is arranged regularly along a length direction of the flexible ruler body, thereby a linear resistance of the conductive layer changes regularly along the length direction of the flexible ruler body. The measuring device includes a data collector and a date processor, the data collector includes a resistance measuring circuit, and the resistance measuring circuit includes a positive probe, a negative probe and a data output terminal, when measuring with the flexible ruler body, the positive probe and the negative probe are correspondingly connected to the conductive layer to measure a resistance value of a part of the conductive layer corresponding to a measuring part of the flexible ruler body; the data processor is electrically connected to the data output terminal, the data processor is configured to convert the resistance value measured by the data collector into a length value based on a variation rule of the linear resistance of the conductive layer along the length direction of the flexible ruler body.

In an embodiment, the flexible measuring ruler includes a shell, an end of the flexible ruler body extends from an inner side of the shell to an outer side of the shell, and an extended end of the flexible ruler body can move along a length direction of the flexible ruler body; the conductive layer is disposed on a top of the flexible ruler body, the conductive layer is arranged in U-shape and a closed end of the conductive layer is close to the extended end of the flexible ruler body; the positive probe and the negative probe are disposed above the extended end of the flexible ruler body, the positive probe is in contact with a side of the conductive layer, and the negative probe is in contact with another side of the conductive layer.

In an embodiment, the flexible measuring ruler includes a shell, an end of the flexible ruler body extends from an inner side of the shell to an outer side of the shell, and an extended end of the flexible ruler body can move along a length direction of the flexible ruler body; the conductive layer is disposed on a top of the flexible ruler body; the positive probe is disposed above the extended end of the flexible ruler body and in contact with the conductive layer; the negative probe is connected to an end facing away from the extended end of the flexible ruler body of the conductive layer.

In an embodiment, the flexible measuring ruler includes a shell, an end of the flexible ruler body extends from an inner side of the shell to an outer side of the shell, and an extended end of the flexible ruler body can move along a length direction of the flexible ruler body; the conductive layer is disposed on a top of the flexible ruler body; a bottom of the flexible ruler body is provided with a connecting layer arranged along the length direction of the flexible ruler body; an end of the connecting layer close to the extended end of the flexible ruler body is electrically connected to the conductive layer through the flexible ruler body, the positive probe is disposed above the extended end of the flexible ruler body, and the positive probe is in contact with the conductive layer, and the negative probe is connected to an end of the connecting layer facing away from the extended end of the flexible ruler body.

In an embodiment, the flexible measuring ruler includes a shell, an end of the flexible ruler body extends from an inner side of the shell to an outer side of the shell, and an extended end of the flexible ruler body can move along a length direction of the flexible ruler body; the conductive layer is sleeved on an outer side of the flexible ruler body, an inner side of the flexible ruler body is provided with a connecting layer arranged along the length direction of the flexible ruler body, the flexible ruler body is sleeved on an outer side of the connecting layer, and an end of the conductive layer close to the extended end of the flexible ruler body is electrically connected to the connecting layer; the positive probe is disposed above the extended end of the flexible ruler body, the positive probe is in contact with the conductive layer, and the negative probe is connected to an end of the connecting layer facing away from the extended end of the flexible ruler body.

In an embodiment, the flexible ruler body penetrates the shell along the length direction of the flexible ruler body; and the flexible ruler body is slidably connected to the shell.

In an embodiment, the inner side of the shell is provided with a longitudinal arranged installation shaft, and the flexible ruler body is curled on the installation shaft; another end of the flexible ruler body is connected to the installation shaft through a scroll spring.

In an embodiment, the measuring device includes a signal transmitter; the signal transmitter is connected to the data processor, and the data processor communicates with a terminal device through the signal transmitter.

In an embodiment, the measuring device includes a display, the display is connected to the data processor.

In an embodiment, the conductive layer is a polyimide film doped with graphene, and the flexible ruler body is made of glass fiber and polyvinyl chloride (PVC).

The embodiments of the disclosure provide the flexible measuring ruler, compared with the prior art, the beneficial effect is that: since a linear resistance of a conductive layer changes regularly along a length direction of a flexible ruler body, when the flexible ruler body is measuring, only a resistance value of a part of the conductive layer corresponding to a measuring part of the flexible ruler body is measured by a data collector, and then a measured resistance value is transmitted to a data processor, and the data processor can convert a length value corresponding to the measuring part of the flexible ruler body according to a relationship between the resistance value of the conductive layer and the length value of the flexible ruler body, which is simple in measuring principle and overall structure, easy in measuring operation and high in accuracy; the flexible ruler body is made of flexible material, which can be bent in order to measure objects with irregular shape.

Figure 1:
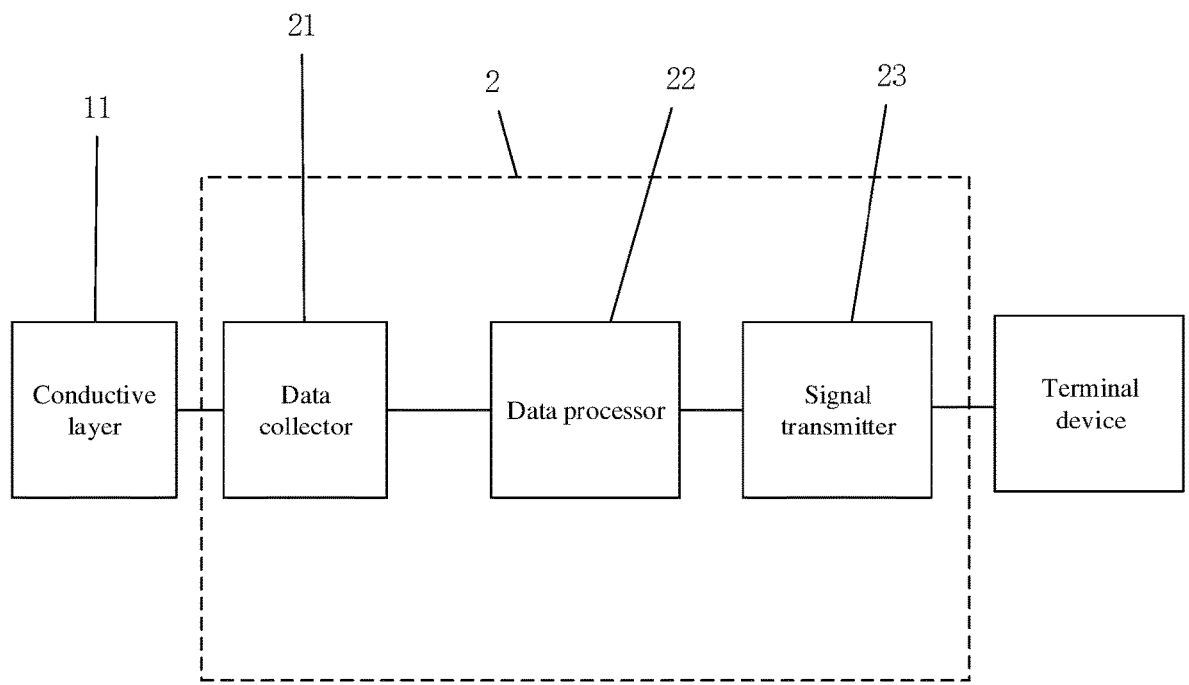
FIG. 1 illustrates a schematic diagram of a component connection relationship of the disclosure.

Description of reference numerals: 1. flexible ruler body; 11. conductive layer; 12. connecting layer; 2. measuring device; 21. data collector; 211. positive probe; 212. negative probe; 22. data processor; 23. signal transmitter; 3. shell; 31. installation shaft; 32. scroll spring.

DETAILED DESCRIPTION OF EMBODIMENTS

Specific embodiments of the disclosure are described in further detail below in conjunction with the accompanying drawings and examples. The following embodiments are used to illustrate the disclosure, but are not intended to limit the scope of the disclosure.

In the description of the disclosure, it should be understood that the directions or positional relationships indicated by the terms "center", "vertical", "horizontal", "up", "down", "front", "back", "left", "right", "vertical", "horizontal", "top", "bottom", "inside", "outside", etc. used in the disclosure are based on the directions or positional relationships shown in the accompanying drawings, solely for the convenience of describing the disclosure and simplifying the description, Rather than indicating or implying that the device or component referred to must have a specific orientation, be constructed and operated in a specific orientation, therefore it cannot be understood as a limitation of the disclosure. In addition, the terms "first," "second," and "third" are only used to describe the purpose and cannot be understood as indicating or implying relative importance.

Embodiment 1

Figure 2:
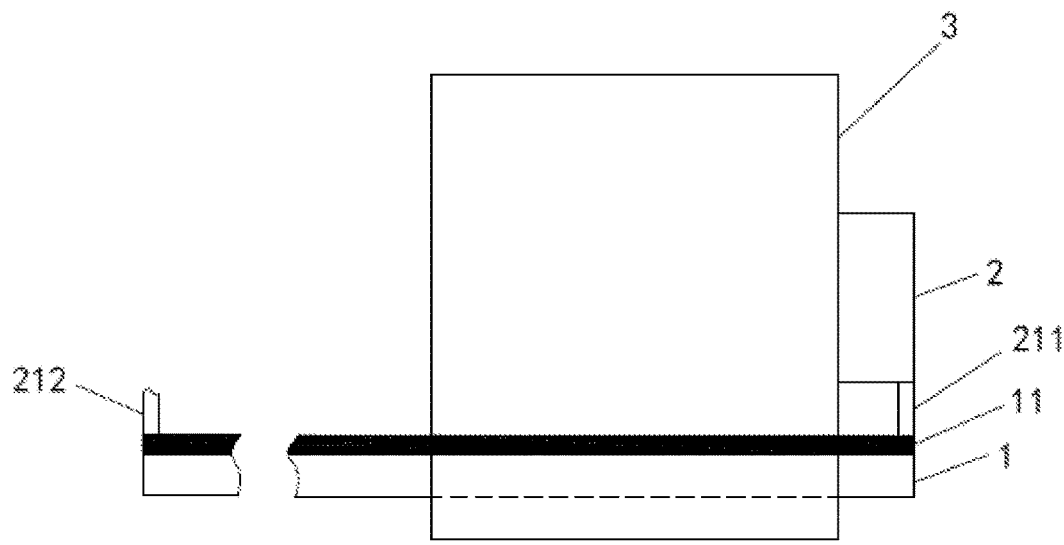
FIG. 2 illustrates a schematic structural diagram according to an embodiment 1 of the disclosure.
Figure 3:
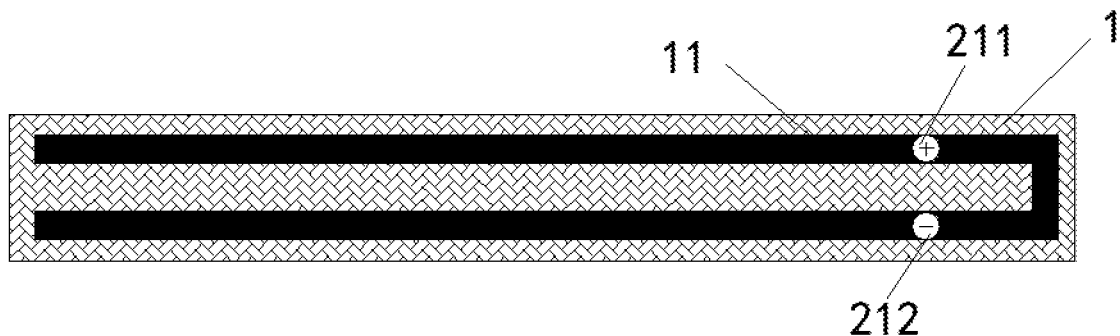
FIG. 3 illustrates a schematic structural diagram of a connecting structure of positive and negative probes and a conductive layer during measurement according to the embodiment 1 of the disclosure.

Referring to FIGS. 1 to 3, the embodiment 1 of the disclosure is as follows.

A flexible measuring ruler includes a measuring device 2 and a flexible ruler body 1, the flexible ruler body 1 is provided with a conductive layer 11 thereon, the conductive layer 11 is regularly arranged (e.g. uniformly distributed) along a length direction of the flexible ruler body 1, thereby a linear resistance of the conductive layer 11 changes regularly along the length direction of the flexible ruler body 1. The measuring device 2 includes a data collector 21 and a date processor 22, the data collector 21 includes a resistance measuring circuit (the resistance measuring circuit is mainly based on a Ohm's law to measure a resistance of an object to be measured, which belongs to the prior art, so it is not described in detail here). The resistance measuring circuit includes a positive probe 211, a negative probe 212 and a data output terminal, when the flexible ruler body 1 is measuring, the positive probe 211 and the negative probe 212 are correspondingly connected to the conductive layer 11 to measure a resistance value of a part of the conductive layer 11 corresponding to a measuring part of the flexible ruler body 1. For example, the positive probe 211 is in contact with an end of the measuring part of the flexible ruler body 1, and the negative probe 212 is in contact with another end of the measuring part of the flexible ruler body 1, the data processor 22 is electrically connected to the data output terminal, the data processor 22 is configured to convert the resistance value measured by the data collector 21 into a length value based on a variation rule of the linear resistance of the conductive layer along the length direction of the flexible ruler body 1.

A working principle of the embodiment is that: since the linear resistance of the conductive layer 11 changes regularly along the length direction of the flexible ruler body 1, when the flexible ruler body 1 is measuring, only the resistance value of the conductive layer 11 corresponding to the measuring part of the flexible ruler body 1 is measured by the data collector 21, and then a measured resistance value is transmitted to the data processor 22, and the data processor 22 can obtain the length value of the measuring part of the flexible ruler body 1 according to a variable rule relationship between the resistance value of the conductive layer 11 and the length value of the flexible ruler body 1 (the variable rule relationship is artificially designed during production, achieved through the regular arrangement of the conductive layer 11, such as a resistance value of the conductive layer 11 corresponding to each centimeter of the flexible ruler body 1 is 100 ohms.), which is simple in measuring principle and overall structure, easy in measuring operation and high in accuracy. The flexible ruler body 1 is made of flexible material, which can be bent in order to measure objects with irregular shape, achieving precise measurement of irregular distances such as a waist circumference or an arm circumference.

In an embodiment, the flexible measuring ruler includes a shell 3, an end of the flexible ruler body 1 extends from an inner side of the shell 3 to an outer side of the shell 3, and an extended end of the flexible ruler body 1 can move along a length direction of the flexible ruler body 1. The conductive layer 11 is disposed on a top of the flexible ruler body 1, the conductive layer 11 is arranged in U-shape and a closed end of the conductive layer 11 is close to the extended end of the flexible ruler body 1. The data collector 21 is fixed to the shell 3, the positive probe 211 and the negative probe 212 are disposed above the extended end of the flexible ruler body 1, the positive probe 211 is in contact with a side of the conductive layer 11, and the negative probe 212 is in contact with another side of the conductive layer 11. Generally, the positive probe 211 and the negative probe 212 are aligned so that the data processor 22 can convert a length value based on a resistance value of the conductive layer 11. In an initial state, the positive probe 211 is in contact with an end of the side of the conductive layer 11, and the negative probe 212 is in contact with the another side of the conductive layer 11, when measuring, the extended end of the flexible ruler body 1 moves along the length direction of the flexible ruler body 1 to a side facing away from the shell 3, a distance moved by the extended end of the flexible ruler body 1 is the length of the measuring part of the flexible ruler body 1, during the movement of the flexible ruler body 1, positions of the positive probe 211 and the negative probe 212 remain unchanged and are in contact with the conductive layer 11 correspondingly, as the closed end of the conductive layer 11 is close to the extended end of the flexible ruler body 1, the positive probe 211 is in contact with the side of the conductive layer 11 and the negative probe 212 is in contact with the another side of the conductive layer 11, thus the positive probe 211, a part of the conductive layer 11 corresponding to the measuring part of the flexible ruler body 1 and the negative probe 212 form a circuit to realize the measurement of the resistance value of the part of the conductive layer 11 corresponding to the measuring part of the flexible ruler body 1, which can be achieved by simply moving flexible ruler body 1 without adjusting the positions of the positive probe 211 and negative probe 212, making it convenient for measurement operations.

In an embodiment, the flexible ruler body 1 penetrates the shell 3 along the length direction of the flexible ruler body, and the flexible ruler body 1 is slidably connected to the shell 3, so that an extended end of the flexible ruler body 1 moves along the length direction of the flexible body. In order to avoid a separation of the flexible ruler body 1 from the shell 3, two ends of the flexible ruler body 1 are provided with limit blocks correspondingly.

In an embodiment, the measuring device 2 includes a signal transmitter 23. The signal transmitter 23 is connected to the data processor 22, and the data processor 22 communicates with a terminal device (i.e. mobile phone) through the signal transmitter 23, such as remote communication through a wireless communicator such as Bluetooth and Wi-Fi can be achieved, so as to record and store data obtained from the measuring.

In an embodiment, the measuring device 2 includes a display, the display is connected to the data processor 22, and the data processor 22 transmits a converted distance value to the display for displaying, so as to clearly know a measured distance value.

The conductive layer 11 can be made of a conductive film material, a conductive composite material, a conductive fiber material, or a conductive fiber aggregate material, preferably a flexible conductive polymer film or a conductive composite material, such as a polyethylene terephthalate film doped with carbon nanotubes, carbon fibers, etc. In the embodiment, the conductive layer 11 is a polyimide film doped with graphene. The conductive layer 11 can be a conductive layer with a certain specification pattern formed on the flexible ruler body 1 through screen printing, orifice printing, spraying or thermal bonding, weaving, sewing or embroidery. The conductive layer 11 can be a double-layer or multi-layer flexible conductive film obtained through deposition, electroless plating, electrochemical plating, etc. The conductive layer 11 can be of any shape, such as a straight line, wave shape, curve, triangle, rectangle, square, or artistic pattern. The form of the conductive layer 11 is not limited to a flat shape, but can also be a long circular tube type, a long cylindrical type, a cable type, a long wire type, a strand type, etc.

In an embodiment, a material of the flexible ruler body 1 is glass fiber and PVC, which are insulation materials with high flexibility and can be bent but not stretched. In addition, the flexible ruler body 1 can also be woven from glass fiber as warp yarn, or a composite material encapsulated by elastic material. In addition to flat materials such as cloth, the flexible ruler body 1 can also be fiber like, yarn like, or cable like materials such as carbon fiber filament or silver plated nylon wire.

Embodiment 2

Figure 4:
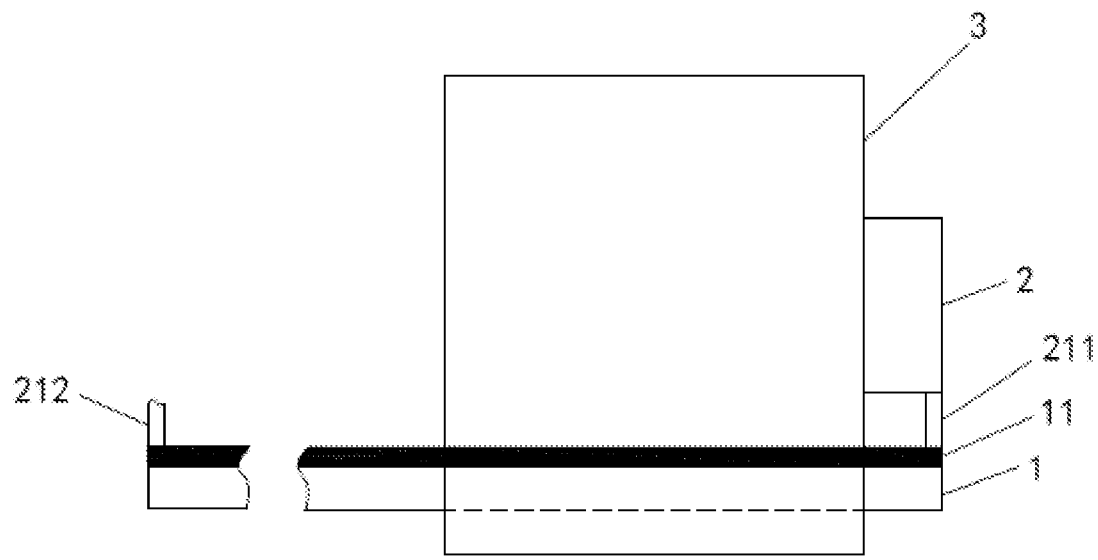
FIG. 4 illustrates a schematic structural diagram according to an embodiment 2 of the disclosure.
Figure 5:
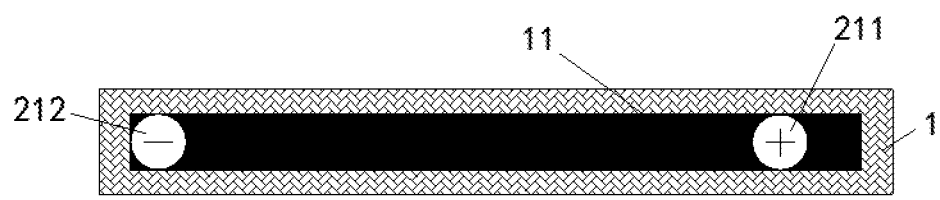
FIG. 5 illustrates a schematic structural diagram of a connecting structure of positive and negative probes and a conductive layer during measurement according to the embodiment 2 of the disclosure.

Referring to FIGS. 4 and 5, the embodiment 2 of the disclosure is as follows.

The flexible measuring ruler includes a shell 3, an end of the flexible ruler body 1 extends from an inner side of the shell 3 to an outer side of the shell 3, and an extended end of the flexible ruler body 1 is capable of moving along a length direction of the flexible ruler body 1. In the embodiment, a conductive layer 11 is in a shape of strip, and the conductive layer 11 is disposed on a top of the flexible ruler body 1. A positive probe 211 is disposed above the extended end of the flexible ruler body 1 and is in contact with the conductive layer 11. A negative probe 212 is connected to an end of the conductive layer 11 facing away from the extended end of the flexible ruler body 1. In an initial state, the positive probe 211 is in contact with an end of the conductive layer 11 close to the extended end of the flexible ruler body 1, and the negative probe 212 is connected to the another end of the conductive layer 11 (to ensure that the negative probe 212 keeps in contact with the conductive layer 11 during a measurement, the negative probe 212 is fixed to the another end of the conductive layer 11, and the negative probe 212 can move with the another end of the conductive layer 11), meanwhile, the positive probe 211, the conductive layer 11 and the negative probe 212 form a circuit (when a data collector 21 is energized), and the data collector 21 can measure a resistance value of the conductive layer 11 from the positive probe 211 to the negative probe 212 (generally, the positive probe 211 is in contact with the end of the conductive layer 11 and the negative probe 212 is in contact with the another end of conductive layer 11, that is, the data collector 21 measures a resistance value of the entire conductive layer 11). When measuring, the extended end of the flexible ruler body 1 moves along the length direction of the flexible ruler body 1 to a side facing away from the shell 3, a distance moved by the extended end of the flexible ruler body 1 is the length corresponding to the measuring part of the flexible ruler body 1, in a process of the movement of the flexible ruler body 1, a position of the positive probe 211 remains unchanged and keeps in contact with the conductive layer 11, the negative probe 212 keeps in contact with the another end of the conductive layer 11 (the another end facing away from the extended end of the flexible ruler body 1). And the positive probe 211, a non-measuring part of the conductive layer 11 and the negative probe 212 form a circuit to achieve a measurement of a resistance value of a part of the conductive layer 11 corresponding to the non-measuring part of the flexible ruler body 1, the resistance value of the conductive layer 11 measured in the initial state minus the resistance value of the part of the conductive layer 11 corresponding to the non-measuring part of the flexible ruler body 1 after the measurement, a resistance value of a part of the conductive layer 11 corresponding to the measuring part of the flexible ruler body 1 can be derived, and then a distance value (a measuring length) is converted according to an variable rule, that is, the measurement can be achieved by moving the flexible ruler body 1 without adjusting the positions of the positive probe 211 and the negative probe 212, which is convenient for a measurement operation.

Embodiment 3

Figure 6:
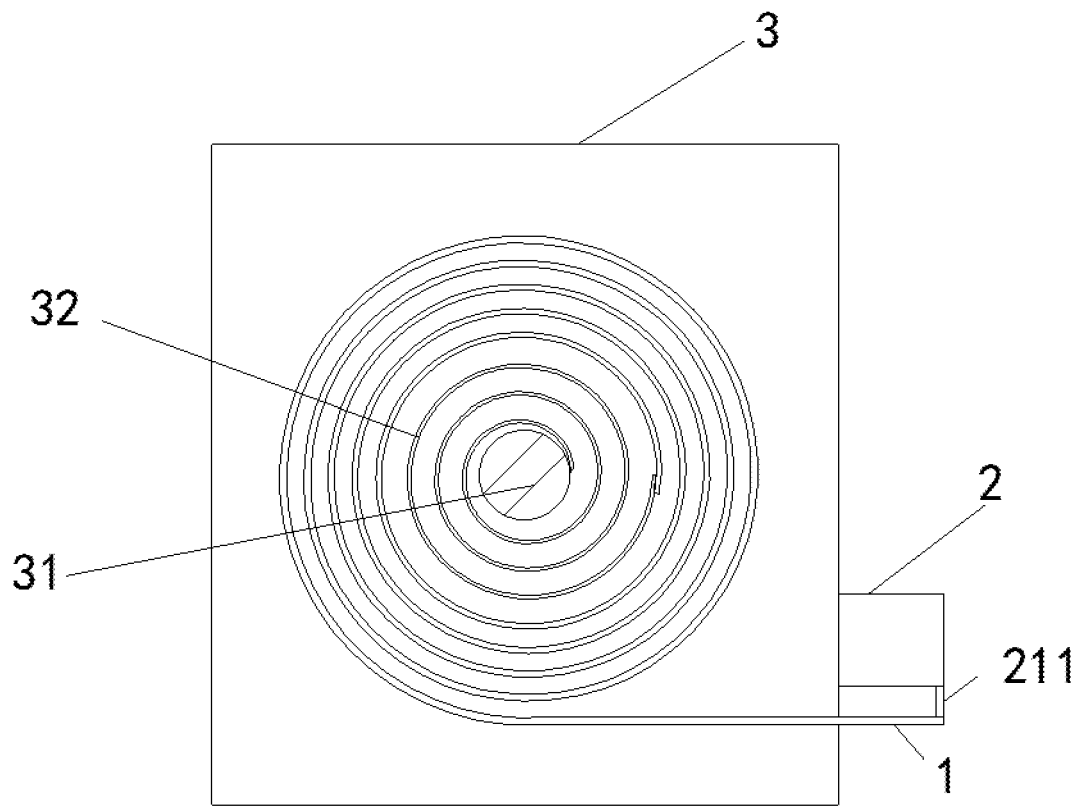
FIG. 6 illustrates a schematic structural diagram according to an embodiment 3 of the disclosure.
Figure 7:
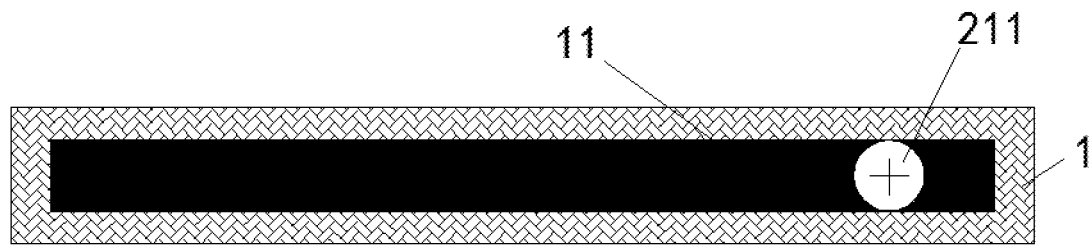
FIG. 7 illustrates a schematic structural diagram of a connecting structure of positive and negative probes and a conductive layer during measurement according to the embodiment 3 of the disclosure.
Figure 8:
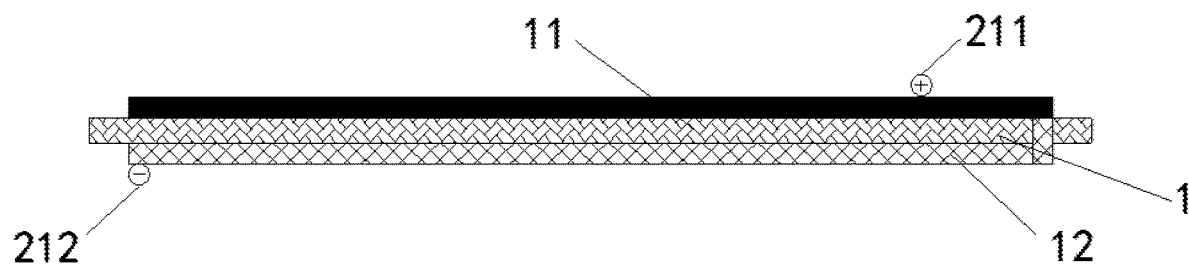
FIG. 8 illustrates a cross-sectional view of the connecting structure illustrated in FIG. 7.

Referring to FIGS. 6 and 8, the embodiment 3 of the disclosure is as follows.

The flexible measuring ruler includes a shell 3, an end of the flexible ruler body 1 extends from an inner side of the shell 3 to an outer side of the shell 3, and an extended end of the flexible ruler body 1 is capable of moving along a length direction of the flexible ruler body 1. In the embodiment, a conductive layer 11 is in a shape of strip, and the conductive layer 11 is disposed on a top of the flexible ruler body 1. A bottom of the flexible ruler body 1 is provided with a connecting layer 12 arranged along the length direction of the flexible ruler body 1 (the connecting layer 12 is made of a conductive material). An end of the connecting layer 12 close to the extended end of the flexible ruler body 1 is electrically connected to the conductive layer 11 through the flexible ruler body 1, a positive probe 211 is disposed above the extended end of the flexible ruler body 1, and the positive probe 211 is in contact with the conductive layer 11, and a negative probe 212 is connected to an end of the connecting layer 12 facing away from the extended of the flexible ruler body 1. In an initial state, the positive probe 211 is in contact with an end of the conductive layer 11 close to the extended end of the flexible ruler body 1, and the negative probe 212 is in contact with the end of the connecting layer 12 facing away from the extended end of the flexible ruler body 1 (to ensure that the negative probe 212 keeps in contact with the connecting layer 12, the negative probe 212 is fixed with the end of the connecting layer 12 facing away from the extended end of the flexible ruler body 1, and the negative probe 212 can move together with the end of the connecting layer 12 facing away from the extended end of the flexible ruler body 1), during a measurement, the extended end of the flexible ruler body 1 moves towards a side facing away from the shell 3 along the length direction of the flexible ruler body 1, a distance moved by the extended end of the flexible ruler body 1 is a length of a measuring part of the flexible ruler body 1. During the movement of the flexible ruler body 1, a position of the positive probe 211 remains unchanged and keeps in contact with the conductive layer 11, while the negative probe 212 keeps in contact with the connecting layer 12. As the end of the connecting layer 12 close to the extended end of the flexible ruler body 1 passes through the flexible ruler body 1 and is electrically connected to the conductive layer 11, the positive probe 211, a part of the conductive layer 11 corresponding to the measuring part of the flexible ruler body 1, the connecting layer 12, and the negative probe 212 form a circuit to measure a resistance value of the part of the conductive layer 11 corresponding to the measuring part of the flexible ruler body 1 (the data processor 22 needs to firstly subtract a resistance value of the connecting layer 12 during conversion), which means that the measurement can be achieved by simply moving the flexible ruler body 1 without adjusting the positions of the positive probe 211 and the negative probe 212, and it is easy to measure and operate.

In order to facilitate the storage of the flexible ruler body 1 and reduce an occupied space of the flexible ruler body 1, for example, a longitudinally arranged installation shaft 31 is provided inside the shell 3. The flexible ruler body 1 is curled on the installation shaft 31, and another end of the flexible ruler body 1 is connected to the installation shaft 31 through a scroll spring 32, a structural principle of the flexible ruler is consistent with the prior art, that is, under normal conditions, the flexible ruler body 1 is stored inside the shell 3, during the measurement, the flexible ruler body 1 is pulled out and uncoiled, after the measurement, under an action of the scroll spring 32, the flexible ruler body 1 can automatically return to the initial state.

Embodiment 4

Figure 9:
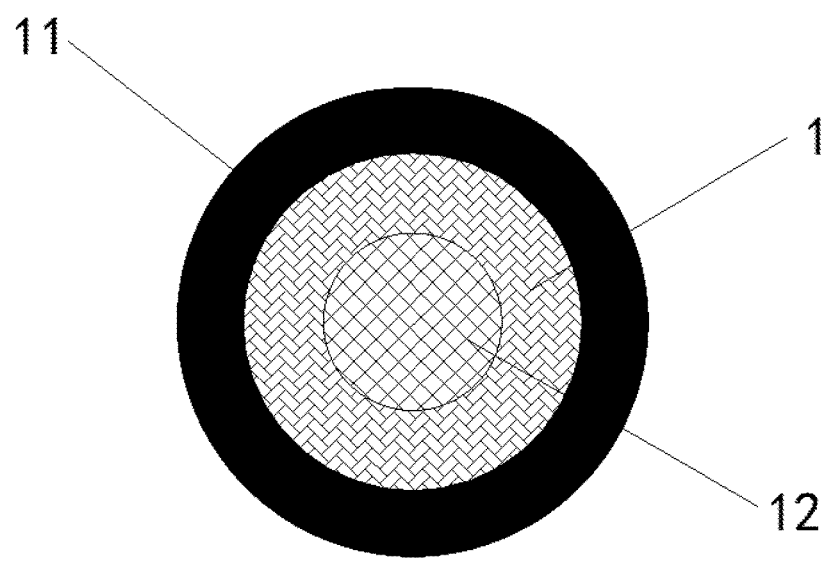
FIG. 9 illustrates a cross-sectional view of a conductive layer according to an embodiment 4 of the disclosure.
Figure 10:
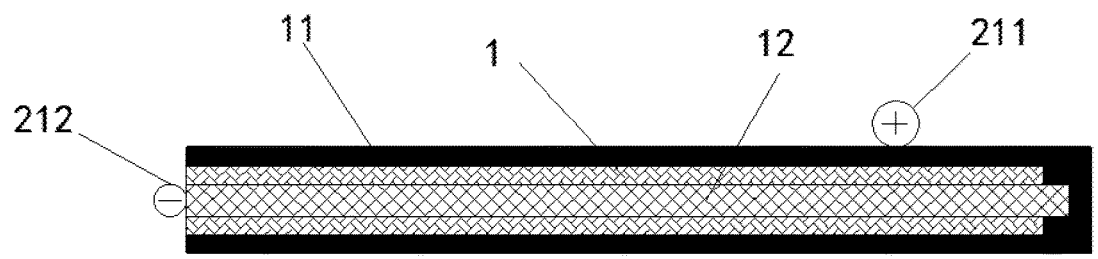
FIG. 10 illustrates a schematic structural diagram of a connecting structure of positive and negative probes and a conductive layer during measurement according to the embodiment 4 of the disclosure.

Referring to FIGS. 9 and 10, the embodiment 4 of the disclosure is as follows.

The flexible measuring ruler includes a shell 3, an end of the flexible ruler body 1 extends from an inner side of the shell 3 to an outer side of the shell 3, and an extended end of the flexible ruler body 1 is capable of moving along a length direction of the flexible ruler body 1. In the embodiment, a conductive layer 11 is sleeved on an outer side of the flexible ruler body 1, an inner side of the flexible ruler body 1 is provided with a connecting layer 12 arranged along the length direction of the flexible ruler body 1, the flexible ruler body 1 is sleeved on an outer side of the connecting layer 12, and an end of the conductive layer 11 close to the extended end of the flexible ruler body 1 is electrically connected to the connecting layer 12. A positive probe 211 is disposed above the extended end of the flexible ruler body 1, the positive probe 211 is in contact with the conductive layer 11, and the negative probe 212 is connected to an end of the connecting layer 12 facing away from the extended end of the flexible ruler body 1 (to ensure that the negative probe 212 keeps in contact with the connecting layer 12 during a measurement, the negative probe 212 is fixed to the end of the connecting layer 12 facing away from the extended end of the flexible ruler body 1, and the negative probe 212 can move together with the end of the connecting layer 12 facing away from the extended end of the flexible ruler body 1). A measurement principle of the embodiment 4 is consistent with the embodiment 3, which is achieved by measuring a resistance value of a part of the conductive layer 11 corresponding to a measurement part of the flexible ruler body 1 through a circuit composed of the positive probe 211, the part of the conductive layer 11 corresponding to the measurement part of the flexible ruler body 1, the connecting layer 12, and the negative probe 212 (the data processor 22 needs to firstly subtract the resistance value of the connecting layer 12 during conversion), that is, by simply moving the flexible ruler body 1, the measurement can be achieved, there is no need to adjust the positions of the positive probe 211 and the negative probe 212, which makes it easy to measure and operate.

In the embodiment, the flexible ruler body 1 is a shape of cylinder, a flexible, lightweight, and slender intelligent ruler technology is achieved by using materials and technologies such as textiles, yarns, metal wires, conductive composite materials, and coatings, and a lower limit of a size of the flexible ruler body 1 can be pushed down to a micrometer level. When combined with today's increasingly integrated digital and analog circuit technologies, micro intelligent rulers with button size levels (diameter of about 1 cm-2 cm) can be prepared to manufacture.

The above are only some of the embodiments of the disclosure, it should be pointed out that for those skilled in the art, several improvements and replacements can be made without departing from the technical principles of the disclosure. These improvements and replacements should also be considered as the scope of protection of the disclosure.

What is claimed is:

1. A flexible measuring ruler, comprising:
   a flexible ruler body;
   a conductive layer, disposed on the flexible ruler body, the conducting layer being regularly arranged along a length direction of the flexible ruler body, thereby making a linear resistance of the conductive layer change regularly along the length direction of the flexible ruler body;
   a measuring device, comprising a data collector and a date processor;
   wherein the data collector comprises: a resistance measuring circuit, and the resistance measuring circuit comprises: a positive probe, a negative probe, and a data output terminal;
   when measuring with the flexible ruler body, the positive probe and the negative probe are correspondingly connected to the conductive layer to measure a resistance value of a part of the conductive layer corresponding to a measuring part of the flexible ruler body; the data processor is electrically connected to the data output terminal, the data processor is configured to convert the resistance value measured by the data collector into a length value based on a variation rule of the linear resistance of the conductive layer along the length direction of the flexible ruler body;
   wherein the flexible measuring ruler comprises a shell, an end of the flexible ruler body extends from an inner side of the shell to an outer side of the shell, and an extended end of the flexible ruler body is capable of moving along the length direction of the flexible ruler body;
   the conductive layer is disposed on a top of the flexible ruler body; a bottom of the flexible ruler body is provided with a connecting layer arranged along the length direction of the flexible ruler body; an end of the connecting layer close to the extended end of the flexible ruler body is electrically connected to the conductive layer through the flexible ruler body, the positive probe is disposed above the extended end of the flexible ruler body, the positive probe is in contact with the conductive layer, and the negative probe is connected to an end of the connecting layer facing away from the extended end of flexible ruler body; or
   the conductive layer is sleeved on an outer side of the flexible ruler body, an inner side of the flexible ruler body is provided with a connecting layer arranged along the length direction of the flexible ruler body, the flexible ruler body is sleeved on an outer side of the connecting layer, and an end of the conductive layer close to the extended end of the flexible ruler body is electrically connected to the connecting layer; the positive probe is disposed above the extended end of the flexible ruler body, the positive probe is in contact with the conductive layer, and the negative probe is connected to an end of the connecting layer facing away from the extended end of flexible ruler body.

2. The flexible measuring ruler as claimed in claim 1, wherein the flexible ruler body penetrates the shell along the length direction of the flexible ruler body; and
   the flexible ruler body is slidably connected to the shell.

3. The flexible measuring ruler as claimed in claim 1, wherein the inner side of the shell is provided with a longitudinal arranged installation shaft, and the flexible ruler body is curled on the installation shaft; another end of the flexible ruler body is connected to the installation shaft through a scroll spring.

4. The flexible measuring ruler as claimed in claim 1, wherein the measuring device comprises a signal transmitter; the signal transmitter is connected to the data processor, and the data processor communicates with a terminal device through the signal transmitter.

5. The flexible measuring ruler as claimed in claim 1, wherein the measuring device comprises a display, the display is connected to the data processor.

6. The flexible measuring ruler as claimed in claim 1, wherein the conductive layer is a polyimide film doped with graphene, and the flexible ruler body is made of glass fiber and polyvinyl chloride (PVC).

* * * * *